United States Patent Office 3,526,513
Patented Sept. 1, 1970

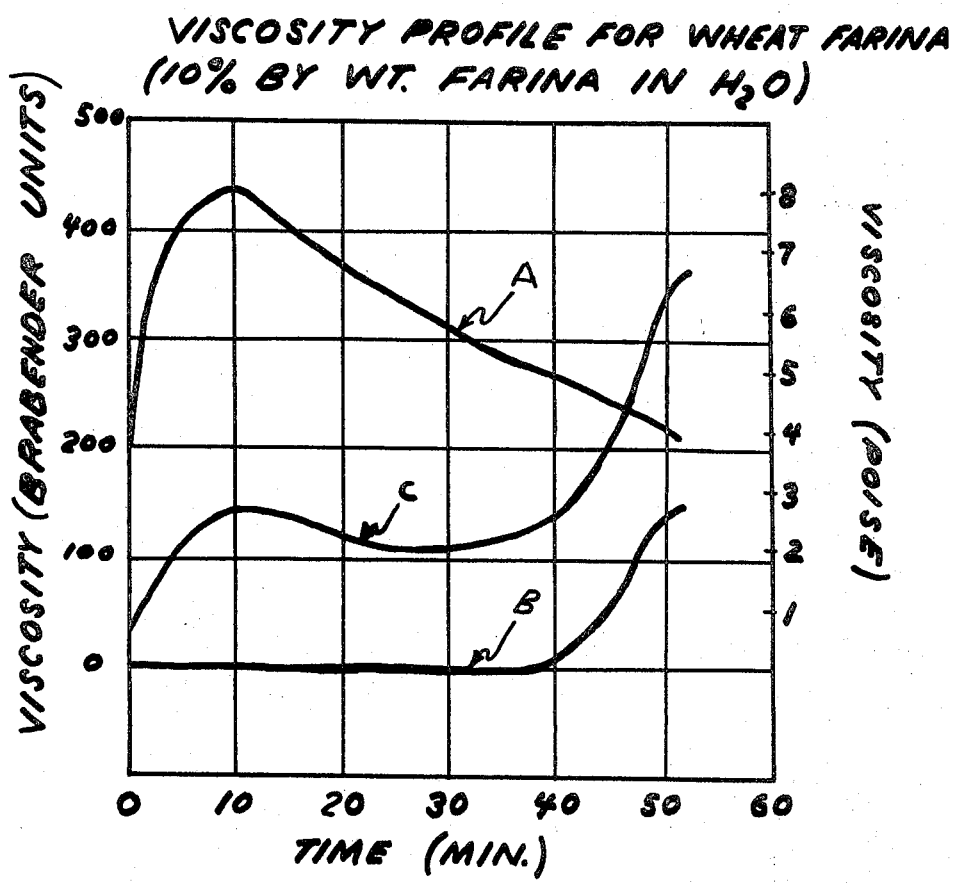

3,526,513
INSTANT WHEAT FARINA
Roy G. Hyldon, Crystal Lake, Ill., assignor to The Quaker Oats Company, Chicago, Ill., a corporation of New Jersey
Filed Nov. 8, 1967, Ser. No. 681,346
Int. Cl. A23l 1/10
U.S. Cl. 99—83         4 Claims

ABSTRACT OF THE DISCLOSURE

An instant wheat farina is produced by: (A) denaturing wheat farina; (B) adding the denatured farina to critical amounts of a thickening agent and water; (C) cooking the mixture on a drum drier; and (D) comminuting the cooked, dried product.

BACKGROUND OF THE INVENTION

Field of the invention

This invention relates to an instant wheat farina process and a product made by the process.

Description of the prior art

Many attempts have been made to produce a truly "instant" wheat farina product. These attempts have gone far toward reducing the required cooking time for such products, but they have failed to produce a truly "instant" product, i.e. a product which can be prepared in the bowl without a cooking step by the consumer. Although prior attempts have been successful in reducing the cooking time of wheat farina products, this has generally been done at the expense of texture and flavor characteristics. Prior to my invention, therefore, there has been a definite need for an instant wheat farina product that has excellent flavor and texture characteristics.

Several different approaches have been used in order to produce an instant wheat farina product. Among the latest and more advanced of these approaches is the one described in U.S. Pat. No. 2,890,118, issued to Cantor et al., in which it is taught that required cooking time of wheat farina can be reduced by addition thereto of certain thickening and suspending agents such as gums. While this approach has greatly reduced the cooking time required for farina products, the product still must be cooked by the consumer. Prior to my invention, therefore, there has been no known acceptable instant farina product which frees the consumer from the dirty pots and pans necessary in cooking prior wheat farina products. There has thus existed a great need for an instant wheat farina product that still has good flavor and texture characteristics.

SUMMARY OF THE INVENTION

It is an object of this invention to produce an instant wheat farina product which can be rehydrated by mere addition thereto of water.

It is another object of this invention to produce an instant wheat farina product which has excellent flavor and texture characteristics.

It is a further object of this invention to produce a process for producing an instant wheat farina product.

The objects of this invention are accomplished by a process comprising the steps:

(A) Denaturing wheat farina by a heat-moisture treatment;
(B) Admixing from 0.1 to 10 parts by weight of a thickening agent and from 50 to 300 parts by weight water with from 90 to 99.9 parts by weight of the denatured wheat farina;
(C) Cooking the mixture of farina, thickening agent, and water by forming it in a thin sheet on an internally-heated, rotating drum drier; said thin sheet having a thickness of from 0.010 to 0.025 inch, and said cooking being sufficient to reduce the moisture content to below 10 percent water by weight; and
(D) Comminuting the dried product to form an instant wheat farina product.

By the term "instant" as used herein, I intend to mean a product that does not require a cooking step by the consumer, i.e. a product that can be prepared for use simply by adding water to it and mixing it in the cereal bowl.

I have found that the steps of my process are critical, including both the order of the steps and the ingredients used therein. Furthermore, I have found that my new and unique product can be produced only by my new process. Simple mixing of the ingredients does not produce an acceptable product. Neither does simple mixing of the ingredients plus cooking in a pan or oven produce an acceptable product. My invention, therefore, consists of a new and useful process and a product produced by the process.

Attempts by others to produce instant grain products have included the addition of certain thickening agents to the grains. These thickening agents include most of the natural and synthetic gums, and the thickening agents are generally held to be interchangeable, i.e. one can be substituted for another. I have found, however, that mere inclusion of a thickening agent to wheat farina is not sufficient to produce an instant wheat farina product as defined herein. I have found that it is only when a proper thickening agent is utilized in accordance with my process that an acceptable wheat farina product results. The thickening agents that I have found to be acceptable for use in this invention must be capable of hydrating rapidly with water, must be edible, and must not be completely degraded by highly ionic substances such as sodium chloride. The thickening agents that I have found to exhibit these properties include the edible polysaccharide gums and salts thereof. Edible polysaccharide gums include both true gums of vegetable origin and synthetic gums such as carboxymethylcellulose (the preferred thickening agent) and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents. A general classification of such gums is as follows:

(A) Plant gums—dried extrudates from certain trees or shrubs in the form of tears, flakes, or annular fragments that have been formed by bark fissures or incisions. The more important ones include acacia (gum arabic), Australian, cape, carmania, gedda, ghatti, karaya, mesquite, mogadore, Persian, shiraz, talha, and tragacanth. Others of lesser importance include amrad, angico, apricot, brea, cashew, cebil, cedar, chagual, cherry, damson, jeol, mango, plum, and sassa.

(B) Plant mucilages—derived from seeds, roots or other plant parts usually by extraction with water. This class includes althea root, chia seed, Iceland moss, linseed (flaxseed), locust bean, psyllium seed, quince seed, slippery elm bark and guar bean.

(C) Mucilaginous materials known as hydrophylic colloids obtained from two general groups of brown and red algae. This class includes agar, Irish moss (carrageen), and algin.

When the source material from gum is acidic, i.e. algin and Irish moss, the commercially available edible gum is a derivative of the acid such as a soluble salt or ester, i.e. propylene glycol ester of alginic acid. In general, to be satisfactory, any gum employed must be edible, have no undesirable flavor, disperse rapidly in hot water, and not be completely degraded by highly ionic substances such as sodium chloride.

While any thickening agent having the above-described qualities is acceptable, I have found that the preferred agent is a mixture of from 1 to 5 parts by weight of carboxymethylcellulose with from 1 to 4 parts by weight NaCl. This preferred agent is added to from 90 to 99.9 parts by weight denatured farina in the preferred embodiment. When referring to carboxymethylcellulose, it is to be understood that I am referring to this agent in its commercially pure form or in the form that it is generally used commercially, such as the alkali metal salt of carboxymethylcellulose, i.e. sodium carboxymethylcellulose.

The grain used herein is wheat, and the wheat is subdivided into the farina state. Furthermore, the wheat farina, to be acceptable for use in this invention, must be denatured. While any commercial denaturing process is acceptable, we prefer to use a heat and moisture treatment. This denaturation consists in a series of changes in the wheat protein molecule brought about by the heat and moisture. These changes often consist in the opening up and extension of the highly organized coiled polypeptide chains of the native protein, which affects the viscosity, particle size, solubility, resistance to proteolytic enzymes, formation and disappearance of sulfhydryl groups, and possible loss of certain amino acids or peptides of relatively low molecular weight. As used herein, this denaturation process is also irreversible. Also, while it is critical that the wheat protein be denatured, the denaturation process must not be so severe as to cause gelatinization of the wheat starch, a property which at this point in the process would be so adverse to the desired properties that it would render the product unacceptable.

It may be seen that my product differs significantly from prior attempts to produce an instant wheat farina product. These differences include the precooking of the farina, the use of denatured wheat in the farina state, and the inclusion of critical amounts of an acceptable thickening agent, all of which when added according to my process result in a new and unique product heretofore not known.

The process steps, as are herein defined, are critical. First the wheat farina must be denatured. While any commercial denaturation process is acceptable, it is preferred that this be by a heat-moisture treatment. I have found that one such heat-moisture treatment can be accomplished by introducing the wheat farina into a rotating screw mixer-conveyor supplied with steam injection ports and exposing the farina to steam (25 p.s.i.g. immediately prior to injection) at atmospheric pressure for from 3 to 5 minutes.

The next step in my new process, is the mixing of the denatured wheat farina, as hereinabove described, with the thickening agent. Any type of mixing operation which can thoroughly mix these ingredients is acceptable. The mixture must be sufficiently mixed so that the denatured wheat farina uniformly contributes 90 to 99.9 parts by weight, and the thickening agent contributes from 0.1 to 10 parts by weight. While any thorough mixing process is acceptable, the preferred mixing step is accomplished by adding the mixture to 50 to 300 parts by weight water and thoroughly mixing the resulting slurry. This slurry, when fully mixed, has a viscosity much like that of farina that is prepared for consumption, except that with the lower water content, the slurry becomes thicker than prepared farina.

The next step of this new and unique process consists in cooking the heretofore described wheat farina thickening agent-water mixture. By use of the term "cooking" I intend to refer to heat treatment which causes a loss of birefringence but is not so severe as to produce transparency of the farina particles. The limits on such a treatment must be equivalent to those hereinbelow defined. The cooking can be accomplished in either of two acceptable methods. One method utilizes a precooking step, such as steam injection, followed by cooking on a rotating drum drier. The other method simply utilizes a drum drying process without precooking. The preferred cooking step is to first subject the mixture to steam injection (a rotating screw conveyor supplied with steam ports is acceptable for this) and then form the mixture in a thin sheet on a temperature-controlled plate such as an internally-heated, rotating drum drier. By use of the term drum drier, I intend to mean any temperature controlled plate on which the farina can be placed to be cooked and dried to a moisture content of less than 10 percent by weight. This exposure must have a sufficient temperature-time contact to cook the mixture. Also, the thin sheet so formed must have a thickness at 8 percent by weight water content of from 0.010 to 0.025 inch. While I have found that exposure for 20 seconds at 143° C. is sufficient to produce the desired properties, this temperature and time may be altered as long as approximately the same amount of cooking and drying (i.e. down to below 10 percent by weight moisture) are accomplished. To my knowledge the use of an internally-heated, rotating drum drier on a product such as farina is of itself new and unusual. Normally, one would not attempt to cook or dry a product containing discrete particles on a drum drier because the particles would tend to cause unevenness and tears in the sheet and would thus result either in no product or a product so nonuniform and with such poor quality that it would be totally unacceptable. I have found, however, that a drum drying operation is most desirable in arriving at a good instant wheat farina product.

When referring to thickness of the thin sheet, as used herein, I intend to mean thickness of the discrete farina particles in the sheet. For a thickness of 0.010 to 0.025 inch, the starch matrix surrounding the discrete farina particles has a thickness of about 0.003 to 0.004 inch.

The final step in my process consists in taking the cooked and dried wheat farina product which leaves the above step in the form of a sheet and comminuting the sheet to give a particle size approximately equal to that of farina. Any of the commercially available comminuting machines are acceptable for this step.

Any additional additives such as vitamins, flavoring, and antioxidants may be either added in the mixing step prior to cooking or dry-blended with the product after it is comminuted. If, however, it is desired or preferred to produce a fortified wheat farina product, non-fat dry milk solids or soybean protein must be added in an amount sufficient to create a final protein level of from 10 to 20 percent by weight.

BRIEF DESCRIPTION OF THE DRAWING

This invention may be more fully illustrated by the enclosed drawing which exemplifies the extraordinary difference between my product and the best available wheat farina product on the market.

In the drawing, the top line, designated by the letter A, is a time-temperature-viscosity profile of an instant wheat farina product produced in accordance with this invention. The process used in producing this product is more fully explained and detailed by Example 1 found further on in this discussion, and this product (lettered A) is a sample of the product produced in Example 1. The lower curve, designated by the letter B, is a time-temperature viscosity profile of the most nearly "instant" wheat farina product on the market. The middle curve, designated by the letter C, is the same product as is designated by the lower curve B except the product referred to by the middle curve C has 2.1 percent by weight carboxymethylcellulose added to it.

For each test, 50 grams of the wheat farina product were added to the 450 grams of water. The resulting slurry was quickly added to the cup of an Amylograph-Viscograph, Model GEDC, Brabender Co., Rochelle Park, N.J. The temperature of the farina-water mixture was then increased from room temperature to 40° C. and held constant at 40° C. for about 10 minutes, a time after which the wheat farina product of this invention began to show no change in viscosity. At this point, the unit was adjusted to provide a 1.5° C. temperature increase each minute. This rate of increase was maintained until the temperature reached 96° C. and the unit was then set to maintain the temperature constant at 96° C. A more thorough description of this testing procedure using different temperature reference points can be found in Starch: Chemistry and Technology, Whistler and Paschall, Academic Press, 1967, pages 599–601. Viscosities of the mixtures were recorded via a print-out mechanism and then plotted on the enclosed drawing.

From the drawing it may be clearly seen that this invention significantly advances the technology of instant wheat farina production. Referring to the viscosity profile of my product (line A on the graph) it is readily seen that almost instantaneously upon addition of water, the product achieves the viscosity characteristics of well-cooked and palatable wheat farina. If boiling water is added to my product, as is preferred, this additionally enhances the texture of the product. On the other hand, while directions for the other product (line B on the graph) indicate that it can be prepared by mere addition of boiling water, the product's viscosity profile indicates that it is unresponsive to water until sufficient heat is supplied to cook the farina. It is thus seen that this product is unresponsive to water and heat until it is cooked, and therefore the product cannot truly be termed an "instant" product. Likewise, while addition of a thickening agent (i.e. carboxymethylcellulose in this case) to the other product makes it more nearly "instant," the product still cannot be termed "instant" and still must be cooked by the consumer before consumption. It is thus seen that mere addition of a thickening agent, without the benefits of my process, is not sufficient to make an acceptable "instant" product.

These viscosity profiles clearly show that my product is different and unique and contributes the first really instant wheat farina product to the market.

DESCRIPTION OF THE PREFERRED EMBODIMENTS

This invention is more fully explained but is not limited by the following preferred embodiments.

EXAMPLE 1

A sample of wheat farina was denatured by passing it through a screw conveyor supplied with steam ports (Thermascrew, Reitz Manufacturing Co.) and exposing it to atmospheric pressure steam (25 p.s.i.g. immediately prior to injection) for about 4 minutes. Ninety-one parts by weight of this denatured wheat farina were mixed with 3.5 parts by weight NaCl, 2.5 parts by weight sodium carboxymethylcellulose (CMC–7HOF, Hercules, Inc.), 230 parts by weight water, and minor amounts of flavoring ingredients. The mixture at this point is a thick dispersion which approaches the viscosity characteristics of prepared wheat farina. This mixture was then passed to an internally-heated, rotating drum drier and cooked thereon. The drier was heated to a surface temperature of about 143° C. and contact time was about 0.33 minute, giving a final moisture content of the finished product of about 8 percent by weight. The product thickness at this point was 0.015 inch. This product was then comminuted and packaged.

EXAMPLE 2

Example 1 was repeated with the exception that the thickening agent was guar gum (Jaguar J2S1, Stein, Hall and Co., Inc.).

EXAMPLE 3

Example 1 was repeated with the exception that the thickening agent was sodium alginate (Kelcosol, Kelco Co., Inc.).

The above produced instant wheat farina products were prepared as follows: 21 grams of the farina was placed in a bowl. One-half cup of boiling water was added and the product was then stirred and set aside for 30 seconds. Two tablespoons of milk were added for flavor, and in each case the result was a wheat farina product having excellent flavor and texture. The 30 seconds waiting time is preferred to assure full water absorption by the farina. Unlike other "instant" grain products, this product does not require a special bowl for critical heat balance requirements.

It may thus be seen that I have discovered a new and unique process for making a wheat farina product and that my process produces a product which has properties superior to those of any prior-known wheat farina products.

Therefore, I claim:

1. A process for producing an instant-type wheat farina product which will readily rehydrate with room-temperature water, said process comprising the steps:
   (A) denaturing wheat farina by a heat-moisture treatment;
   (B) admixing from 0.1 to 10.0 parts by weight of a thickening agent comprising an edible polysaccharide gum or salt thereof and from 50 to 300 parts by weight water with from 90 to 99.9 parts by weight of the denatured wheat farina;
   (C) cooking the mixture of denatured farina, thickening agent, and water by forming it in a thin sheet on an internally heated, rotating drum drier, said thin sheet being formed with a thickness at 8 percent by weight water content of from 0.010 to 0.025 inch, and said cooking being sufficient to reduce the moisture content to below 170 percent water by weight;
   (D) comminuting the cooked product to form an instant-type wheat farina which will rehydrate to have the flavor and texture characteristics of cooked farina.

2. A process as in claim 1 wherein the thickening agent is an edible polysaccharide gum.

3. A process as in claim 1 wherein the thickening agent comprises from one to five parts by weight of carboxymethylcellulose and from one to four parts by weight sodium chloride.

4. An instant wheat farina product produced in accordance with the process as defined in claim 1.

References Cited

UNITED STATES PATENTS

| | | | |
|---|---|---|---|
| 2,890,118 | 6/1959 | Cantor et al. | 99—83 |
| 2,999,018 | 9/1961 | Huffman et al. | 99—83 |

RAYMOND N. JONES, Primary Examiner

J. R. HUFFMAN, Assistant Examiner

PO-1050
(5/69)

UNITED STATES PATENT OFFICE
CERTIFICATE OF CORRECTION

Patent No. 3,526,513                     Dated September 1, 1970

Inventor(s)  Roy G. Hyldon

It is certified that error appears in the above-identified patent and that said Letters Patent are hereby corrected as shown below:

Column 6, line 46, "170" should read --10--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents